Jan. 29, 1924.

C. S. LEONARD 1,482,018

NUT CRACKING MACHINE

Filed Nov. 13, 1922          2 Sheets-Sheet 1

INVENTOR

Chester S. Leonard

BY

Charles L. Wright
ATTORNEY

Jan. 29, 1924.
C. S. LEONARD
1,482,018
NUT CRACKING MACHINE
Filed Nov. 13, 1922
2 Sheets-Sheet 2
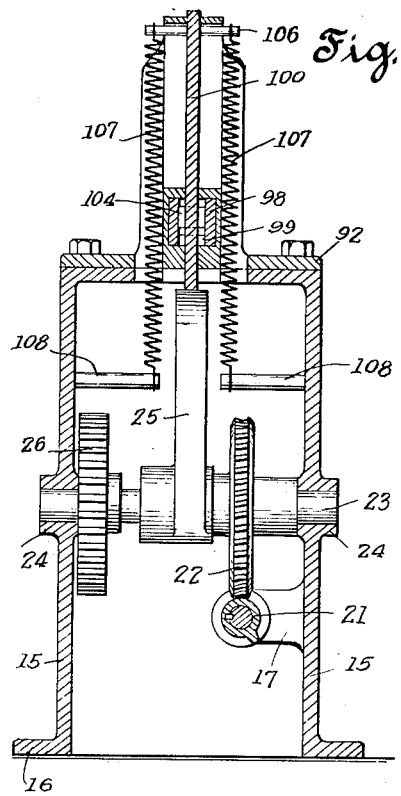
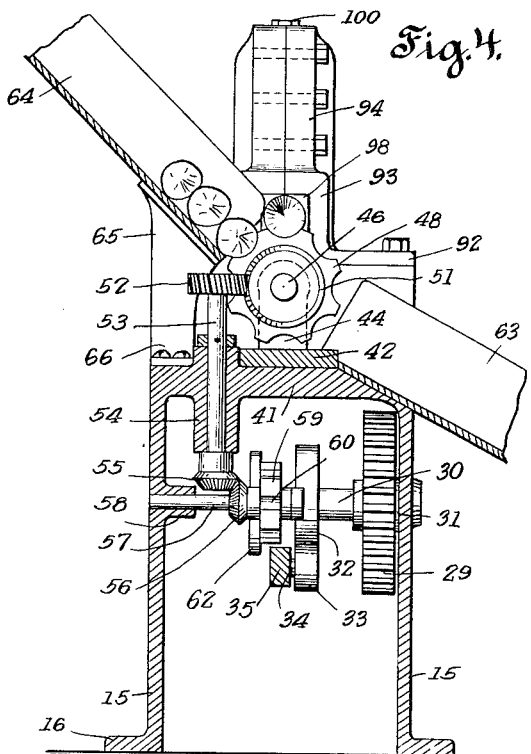
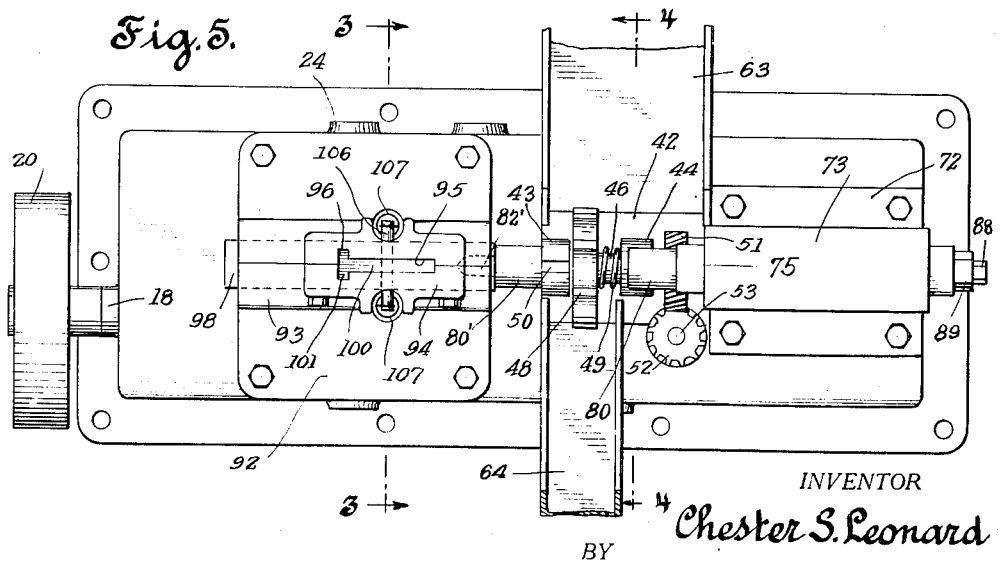
INVENTOR
Chester S. Leonard
BY
Charles L. Wright.
ATTORNEY Patented Jan. 29, 1924.

1,482,018

UNITED STATES PATENT OFFICE.

CHESTER S. LEONARD, OF LANSDOWNE, PENNSYLVANIA.

NUT-CRACKING MACHINE.

Application filed November 13, 1922. Serial No. 600,700.

*To all whom it may concern:*

Be it known that I, CHESTER S. LEONARD, a citizen of the United States, and a resident of Lansdowne, in the county of Delaware and State of Pennsylvania, have invented certain new and useful Improvements in Nut-Cracking Machines, of which the following is a specification.

This invention relates to nut cracking machines and has as one of its objects to produce a power driven apparatus capable of automatically and continuously cracking nuts, irrespective of their lengths, without breaking or damaging the kernels enclosed in the shells.

Another purpose is to provide an apparatus in which the nuts are consecutively brought into position to receive the impact of two plungers, acting respectively as anvil and ram or hammer, the latter being uniformly reciprocated and the anvil element automatically actuated in conformity with the individual nut to be operated upon.

A further aim is in the provision of interchangeable heads, suited to the particular kind of nuts to be cracked, which, in connection with means for shifting the support laterally in accordance with the length of the nut, render the apparatus substantially universal in its applications.

These and other important aims, objects and purposes, such as simplicity of parts, ease and rapidity of operation, non-liability of disarrangement or failure to operate and low cost of construction, are attained by the novel design, construction and arrangement of parts, hereinafter described in detail and shown in the drawings supplementary to this specification, and in which:—

Figure 3 is a transverse vertical sectional view taken on line 3—3 of Figure 5.

Figure 4 is a similar sectional view taken on line 4—4 of Figure 5.

Figure 5 is a top plan view of the same.

Figure 1:
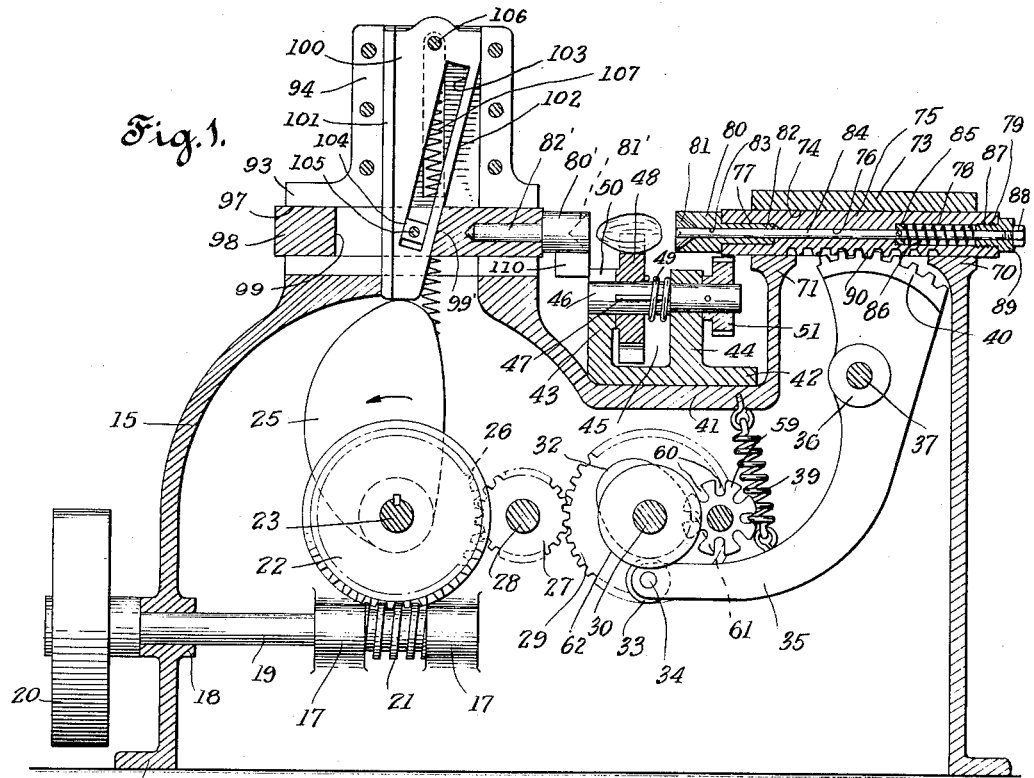
Figure 1 is a longitudinal sectional view taken in a vertical plane substantially at the center of a machine embodying the invention.
Figure 2:
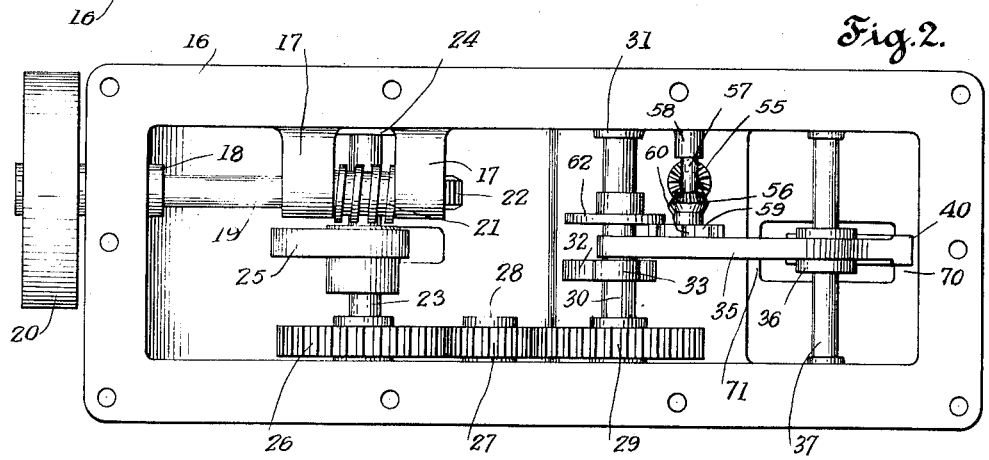
Figure 2 is a bottom plan view of the machine.

While the shape of the frame is immaterial, the present embodiment is illustrated as consisting of an essentially oblong rectangular hollow casting, generally designated by the numeral 15, having a circumambient outwardly extending base flange 16 provided with openings for the reception of screws used in fastening the structure upon a bench or platform by which the operating parts are raised to a convenient height.

Extending in from the rear wall of the frame are a pair of spaced lugs 17 raised from the base and registering with their inner ends are bosses 18 formed with the left hand end wall, these lugs and bosses being bored to receive a driving shaft 19 having on its outer extending end a drive wheel 20.

Fixed to the shaft, by a key, between the lugs 17 is a worm 21, provided with anti-friction thrust bearings at its ends if desired, and meshing with a worm wheel 22 rigid on a short transverse shaft 23 journalled at its ends in bearings 24 formed with the front and rear walls respectively of the frame above the plane of the driving shaft 19.

Rigidly engaged on shaft 23 is a peripheral cam 25 located centrally between the front and rear walls of the frame and having a single throw or rise the purpose of which will be later described.

Also fixed to shaft 23 is a spur gear 26 meshing with an idle pinion 27 freely rotatable on a stud 28 fixed in the rear wall, the pinion meshing with and driving a gear 29 fixed on another transverse shaft 30, near the right hand end of the machine and in the same plane as the shaft 23 and stud 28, the gears 26 and 29 being alike.

Said shaft 30 is rotatably mounted in bearings 31 formed in the opposite side walls of the frame and has rigidly secured upon it another peripheral cam 32 having a single throw, the face of the cam making operative contact with a roller 33, revoluble on a stud 34, extending laterally from the end of an angularly bent lever 35.

The main portion of said lever is provided with a hub 36 drilled to suit a fulcrum spindle 37 fixed in the side walls of the frame and the lever is raised to maintain the roller against the cam by a coiled tension spring 39 extending between eyes fixed respectively in the lever arm and a fixed part of the frame projecting thereover.

A gear segment 40 is integrally formed with the end of the lever 35 opposite the fulcrum, the same functioning for a purpose further on apparent.

The central upper portion of the main frame is depressed, as at 41, and mounted on the level surface of the depression is a bracket 42 having a pair of raised projections 43 and 44 containing between them a space 45.

Revolubly mounted in the upper portions of these projections is a spindle 46 containing a key 47 used to engage a notched carrier 48 slidable on the spindle, a coiled compression spring 49 encircling the spindle and key between the carrier hub and projection 44 through which the spindle extends, the other projection 43, registering with the left hand edge of the base of the bracket 42, and having a narrow recess 50 extending down from its top to the spindle.

Pinned to the extending end of the spindle 46, beyond the projection 44, is a gear 51 having helical teeth meshing with a mating gear 52 fixed on the upper end of a vertical spindle 53, passing through the frame portion 41 and journalled in a depending boss 54.

Fixed on the lower end of spindle 53 is a bevel pinion 55 meshing with a mating pinion 56 rotatable on a stud 57, fixed in a boss 58 extending from the rear wall of the frame, the pinion 56 being fixed to the side of a disc 59 having a series of peripheral notches 60, agreeing in number to the notches of the carrier 48 and being receptive of a pin 61 fixed in the side of a disc 62 rigid on the shaft 30.

Carried by the front portion of the bracket 42 is a delivery chute 63 leading outwardly of the machine and a feed or supply chute 64, carried by a support 65 is bolted at its foot 66 to the frame element 41 at the rear of the machine, the feed chute 64 delivering nuts directly to the notches of the carrier, one at a time, progressively by gravity and from the foregoing description it will be clear that the carrier is rotated intermittently to bring an empty notch or pocket into receiving position at each full revolution of the gear train.

Mounted on the raised elements 70 and 71 of the frame 15 at its right hand end and central thereof, is a cap plate 72 having a raised central longitudinal portion 73 recessed from its lower side to produce a slideway 74 of rectangular cross section to which is fitted a plunger or ram 75.

Said ram contains an axial bore 76 enlarged at 77 at its inner end and also at its outer end as at 78, this latter counterbore being screw-threaded at its open end 79.

A head 80 is formed with a conical depression 81 at its outer end adapted to engage the end of a nut to be cracked and the opposite end is extended into a shank 82.

An axial opening 83 through the head and shank, in register with the bore 76, receives a rod 84 to which is secured a collar 85 normally held against the bottom or inner end of the counterbore 78 by a coiled compression spring 86 encircling the rod within the counterbore and held in compression by a hollow plug 87 fitting the opening 78.

An adjusting nut 88 is threaded to the end of rod 84, the same impinging against the head 89 of the plug 87, thereby affording means for moving the rod so that its opposite, inner end may be adjusted relatively to the end of the head 80, it preferably being in vertical register with the same.

It is to be understood that the axis of the rod 84 is substantially in a plane central with the nuts as engaged by the carrier 48 and that the head 80 and plunger 75 clear the gear 51 and other associated parts as they are moved reciprocatively, at timed intervals by means of rack teeth 90 formed on the lower side of the rectangular plunger 75, the teeth being in engagement with the gear segment 40 operated by the lever, roll and cam device previously described.

On the opposite end of the frame is bolted another cap plate 92, having a raised central portion 93 similar to the corresponding element 73 and which, like it, may be made in two parts for convenience in machining if preferred and thereafter bolted together.

A pair of uprights 94 are raised from the element 93 held together with bolts as shown and have between them a narrow vertical slideway 95 formed with transverse recesses 96, said slideway and recesses serving to guide a slide as further on described.

The element 93 contains a rectangular opening 97 in which operates a plunger 98, hereinafter referred to as an anvil, and which is in alinement with the plunger 75.

The plunger 98 is bored at its inner end to receive the shank 82' of a head 80' containing a conic recess 81' at its projecting end, these heads being so held as to interchange with others having differently formed recesses to engage with variant kinds of nuts.

Formed vertically through the anvil 98 is a slot 99, its rear edge being at a right angle and its front edge 99' at an angle of approximately eighteen degrees thereto.

The vertical slide 100 is essentially a flat plate fitting the slideway 95 and having ribs 101 suited to the recesses 96, said ribs being dimensioned to freely pass through the anvil slot 99 into which the lower end of the slide extends.

The opposite edge 102 of the slide is formed at an angle corresponding to the angular surface 99' of the anvil, and adjacently parallel to the wedge-shaped edge 102, a slot 103 is formed in the plate, this slot engaging a block 104 pivoted on a pin 105 in the slot 99 of the anvil as best seen in Figure 1.

Set transversely in the upper end of the slide 100 is a bar 106 extending uniformly at both sides and engaged at the ends of the bar are coiled tension springs 107 their lower ends being attached to rigid pins 108 extending inwardly from the sides of the frame as seen in Figure 3.

This view also illustrates the cam 25 as making contact with the lower end of the wedge slide, as in the act of raising the same, Figure 1 showing it at its highest point, and it will be apparent that upon further movement of the cam in the direction of the arrow the wedge slide will descend by gravity, accelerated by the tension of the springs 107 and force the anvil 98 forward, the same being returned by the rise of the cam as transmitted by the slide and block 104 actuated by it.

It will also be apparent that the ram or plunger 75 and its associated parts will be coincidentally actuated by the intervening gear train, cam and lever devices before described.

As there is considerable variation in the length of the nuts to be cracked it is important that the carrier support be substantially centered with respect to each individual nut and also that the opposing plungers, that is the anvil and ram, be automatically adjusted in accordance.

To accomplish the first purpose the support or carrier 48, as has been seen, is slidably mounted on its spindle 46 and held normally in one position by the spring 49.

An arm 110 is attached to the head 80' extending downward and in advance of the same, the arm being suited to pass through the slot 50 in the bracket supporting the carrier and adapted to make direct contact with it, thus shifting the carrier and nut lengthwise of the machine a predetermined distance in advance of the head, this distance corresponding to half the average length of the nut.

While this device may not be absolutely accurate, good results are invariably attained, far superior to having the carrier permanently located.

Variation in the forward movement or thrust of the anvil, and hence limitation of the cracking operation, is automatically and accurately attained by the length of each individual nut, which is made part of the device for controlling the forward movement of the anvil.

While the anvil is uniformly retracted by the cam, slide and block device, its forward movement depends entirely on the downward movement of the slide and due to the angle of the surface 102, a slight impedance to the free forward movement of the anvil arrests the further descent of the slide, which then acts as a wedge to prevent recession of the anvil only.

Due to the contact of the spring impelled rod 84 with the adjacent end of the nut, the same will be pushed lengthwise across the carrier and make contact with the head 80', acting as an obstruction and preventing further forward movement of the anvil, the same remaining stationary and positively rigid until the cam 25 raises the slide.

The ram 75 continues forward the full stroke imparted to it by the cam 32, the feeler rod 84 moving rearwardly against the spring 86, the strength of which is insufficient to crack the nut but suffices to eject any portion of shell which may adhere to the head 80.

Although I have described my improvements with considerable detail and with respect to certain particular forms of my invention, I do not desire to be limited to such details since many changes and modifications may well be made without departing from the spirit and scope of my invention in its broadest aspect.

Having thus described my invention, what I claim as new and desire to secure by Letters Patent, is:—

1. A nut cracking machine comprising nut supporting means, an anvil and a ram plunger operable in the plane of the supported nut at opposite ends thereof, means for reciprocating said ram, a slide having an angular edge movable transversely in said anvil, resilient means for actuating said slide in one direction, a cam directly retracting said slide, said slide having an oblique slot parallel with its angular edge, and a block carried by said anvil engaging the slot in said anvil to retract the same.

2. A nut cracking machine comprising nut supporting means, an anvil and a ram plunger operable in the plane of the supported nut at opposite ends thereof, means for reciprocating said ram, a slide having an angular edge movable transversely through said anvil, resilient means for actuating said slide in one direction, a cam operatively engaging said slide to move it in an opposite direction, means for guiding said slide in a plane parallel with its straight edge said slide having a slot parallel with its angular edge, and means operative in the mentioned slot for projecting and retracting said anvil.

3. A nut cracking machine comprising nut supporting means, an anvil and a ram plunger operable in the plane of the supported nut at opposite ends thereof, means for reciprocating said ram, a slide having an angular edge movable transversely in said anvil, resilient means for actuating said slide in one direction a guide for said slide confining it to movement in a vertical plane, and a cam for retracting said slide, said slide directly engaging and moving said anvil and acting as an abutment therefor.

4. A nut cracking machine comprising nut supporting means, an anvil and a ram plunger operable in the plane of the supported nut at opposite ends thereof, means for reciprocating said ram, a slide having an angular edge movable transversely in said anvil and longitudinal ribs on its opposite, straight edge, resilent means for actuating said slide in one direction, a cam for moving said slide in the opposite direction, said slide passing through said anvil and acting as an abutment therefor guides engaging said ribs confining the movement of said slide to a straight path, and means internal of said ram, acting through the medium of a nut on said support for determining the advance movement of said anvil.

5. A nut cracking machine comprising a rotatable and laterally slidable nut supporting means, an anvil and a ram plunger means associated with said anvil for moving said nut supporting means laterally, means for uniformly retracting said anvil, means for advancing said anvil, said advancing means being subject to cessation at any point, means for uniformly reciprocating said ram, a spring impelled rod disposed axially within said ram adapted to engage a nut in advance of the ram and press it against said anvil preventing its further advance, and means for adjusting the pressure on said rod.

6. A nut cracking machine comprising rotatable and slidable nut supporting means controlled by the length of the nut, an anvil and a ram plunger and means for adjusting said supporting means substantially central between said anvil and ram when said elements are approaching each other.

7. A nut cracking machine comprising rotatable and laterally yieldable nut supporting means, an anvil and a ram plunger means for uniformly actuating said ram, and means for automatically differentially actuating said anvil in accordance with the length of the nut.

8. A nut cracking machine comprising a rotatable and laterally yieldable nut carrier, an anvil and a ram plunger means for uniformly actuating said ram, means for actuating said anvil differentially said means being automatic and controlled by the length of the nut, means for actuating said carrier intermittently with relation to the movement of said plungers, and in means for shifting said carrier laterally in accordance with the length of the nut.

9. A nut cracking machine comprising a frame, a gear train therein, an anvil movable in said frame, a slidable ram opposed to said anvil, means for feeding nuts consecutively between said anvil and ram, a single transverse slide passing through and actuating said anvil, a cam directly engaging said slide below the anvil and a cam operated lever for actuating said ram, both of said cams being driven by said gear train.

10. A nut cracking machine comprising a frame, a rotary carrier therein, means for intermittently actuating said carrier, means for moving said carrier laterally to correspond with the center of the nut therein, a movable anvil, a reciprocating ram means for actuating said anvil differentially, said means being automatic and controlled by the length of the nut and adjustable means in said ram controlling the movement of said anvil.

In testimony whereof I have signed my name to this specification.

CHESTER S. LEONARD.